Dec. 1, 1959   P. M. WRIGHT ET AL   2,915,714
FREQUENCY AND PHASE SHIFTERS AND MODULATORS FOR
VERY HIGH FREQUENCY ELECTRO-MAGNETIC WAVES
Filed April 30, 1956
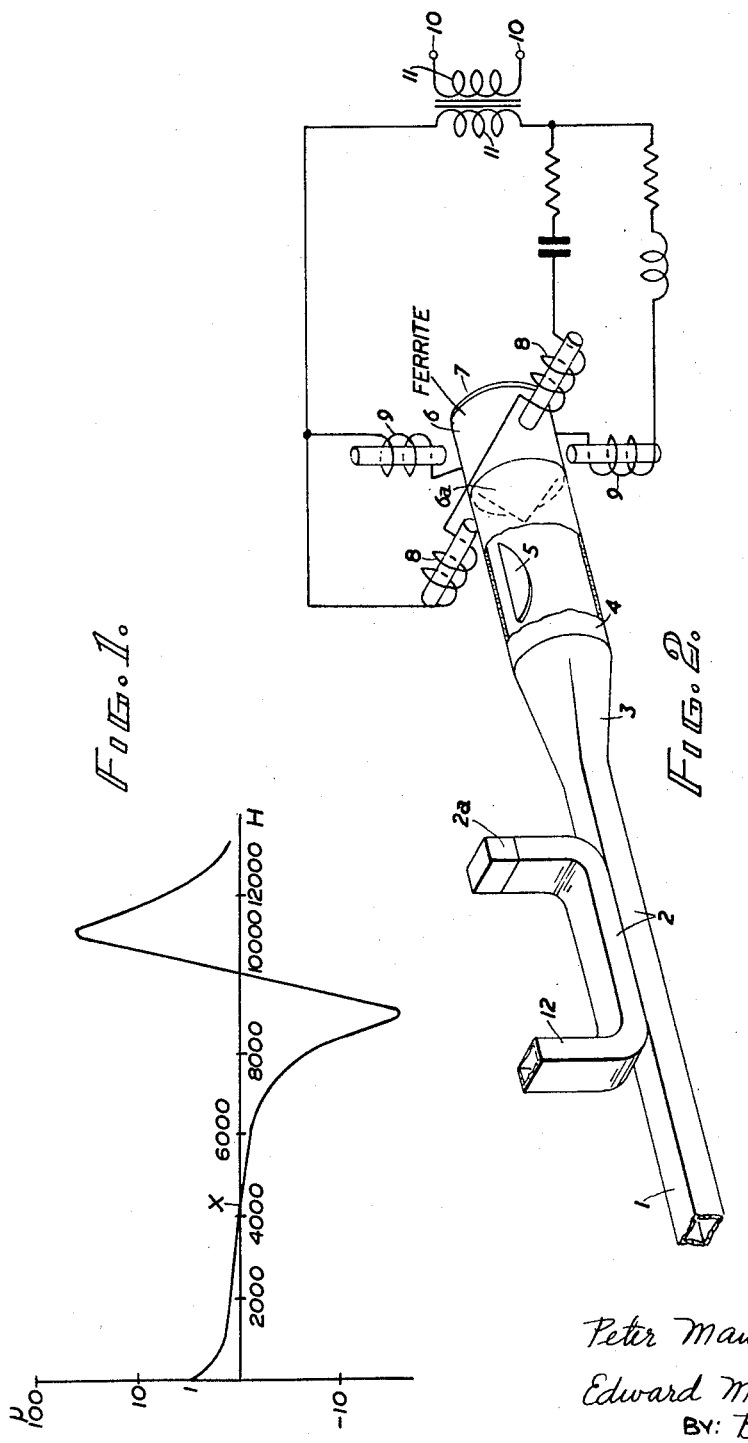
INVENTORS
Peter Maurice Wright
and
Edward Marshall Wells
BY: Baldwin & Wight
ATTORNEYS

United States Patent Office 2,915,714
Patented Dec. 1, 1959

2,915,714

FREQUENCY AND PHASE SHIFTERS AND MODULATORS FOR VERY HIGH FREQUENCY ELECTRO-MAGNETIC WAVES

Peter Maurice Wright, Great Waltham, and Edward Marshall Wells, Chelmsford, England, assignors to Marconi's Wireless Telegraph Company Limited, London, England, a British company Application April 30, 1956, Serial No. 581,688

Claims priority, application Great Britain May 5, 1955

5 Claims. (Cl. 333—31)

This invention relates to frequency and phase shifters and modulators for very high frequency electro-magnetic waves.

A known form of frequency of phase shifter for very high frequency electro-magnetic waves is that known as the "Gardner-Fox" arrangement. In this type of arrangement the waves to be shifted in phase or frequency—assumed for the moment to be plane polarized—are passed through a quarter-wave plate in a circular waveguide to transform them into circularly polarized waves, and these are in turn passed through a half-wave plate which, if frequency shift is required, is continuously rotated in its own plane at a speed of rotation chosen in dependence on the frequency shift required, and, if phase shift is required is set at some arbitrarily chosen angle. If frequency modulation is required the speed of continuous rotation is varied to produce the modulation while oscillation of the plate in its own plane about some arbitrarily chosen angle will produce phase modulation. The waves emerging from the half-wave plate will of course be circularly polarized, but with a direction of rotational sense opposite to that of the incident waves. These emergent waves are then transformed back into plane polarized waves by being passed through a second quarter-wave plate set at the same angle as the first. If the half-wave plate is rotated the total path length through the whole apparatus will be increased by one wave length for each 180° rotation of the said plate.

It has been proposed to employ so-called "Ferrite" in an arrangement of the Gardner-Fox type by constituting the half-wave plate of the arrangement by a ferrite half-wave plate. Such an arrangement will work because, as is known, the effective magnetic permeability of a ferrite body which is magnetized by a magnetic field at right angles to the direction of propagation of the waves through said body depends on the angle between the direction of magnetic polarization of the waves and the direction of magnetization, being of value unity when the direction of magnetic polarization is parallel to the direction of magnetization, and of some other value when the direction of magnetic polarization is perpendicular to the direction of magnetization, this other value depending on the value of the magnetic field through the ferrite.

Fig. 1 of the accompanying drawings is a curve typifying the relation between the effective permeability, $\mu$, of a ferrite and the value, H, of the magnetization when the direction of magnetic polarization of the waves passing through the ferrite is perpendicular to the direction of magnetization, and Fig. 2 is a fragmentary perspective view and diagrammatic view of a representative tube and circuitry for carrying out our invention.

In Figure 1, as will be seen, the ordinate scale is logarithmic. In known arrangements embodying ferrites and as above described, H is chosen at a very low value to produce operation near the ordinate axis of Fig. 1 over the sloping part of the curve near that axis. If, with such an arrangement the magnetic field is rotated about an axis corresponding to the direciton of wave propagation, the apparatus works as a Gardner-Fox device, the outgoing wave being shifted in frequency by $\pm 2n$, where $n$ is the number of revolutions per second of the magnetic field. The rotation of the magnetic field can, of course, be obtained either mechanically or without mechanically moving parts by constituting said field as the resultant of two equal amplitude mutually perpendicular fields energized in quadrature.

A known ferrite arrangement as above described presents a number of serious disadvantages. In the first place, the half-wave ferrite plate has to transmit both plane components of the circular polarization but with different phase velocities. Accordingly, good impedance matching must be obtained at both entry to and exit from the ferrite body. The obtaining of good impedance matching requires that the ferrite be operated as nearly as may be to the ordinate axis of Fig. 1 where the value of $\mu$ is unity, but the requirement that the two mutually perpendicular plane components be transmitted with substantially different phase velocities involves that the operating point of the ferrite for one of them shall be where $\mu$ is very different from unity. The two requirements are thus in contradiction and, in practice, a more or less unsatisfactory compromise has to be adopted, sufficient differential phase change being obtained by using a long length of ferrite so that ferrites of low loss are required and such ferrites are difficult to obtain, expensive and even so not, in general, of as low a loss as is desirable. In addition a high degree of consistency of the applied magnetic field is required, for if, at any point in the operating cycle, the instantaneous value of the magnetic field is such as to produce a differential phase shift of other than 180° between two orthogonal linear components of the circularly polarized wave incident upon the ferrite half-wave plate, the wave emergent therefrom will be elliptically polarized and will, after passage through the second quarter wave plate, have a plane component at right angles to the desired plane of polarization. Although such a component, if of steady value, could be removed without much difficulty, if it is not steady—i.e. of the applied field varies—amplitude modulation of the emergent waves will occur and this will have undesired frequency components. The required high stability of field is extremely difficult to achieve especially in the practically important case in which the rotating field is obtained by phase splitting methods without mechanical rotation, for in such a case the field pattern at any instant depends not only on the currents through the mutually perpendicular coils by which the rotating field is generated, but also on their dispositions and on the shapes of the pole pieces.

The object of the present invention is to provide improved frequency and phase shifters and modulators of the ferrite type which shall not present the foregoing difficulties and disadvantages and which, in particular, do not call for any very great accuracy of setting of the applied magnetic field.

According to this invention, a phase shifter for shifting very high frequency electro-magnetic waves is provided which comprises in combination with a source of circularly polarized waves to be shifted in frequency by phase shifting means, a ferrite body, where there are means for directing the circularly polarized waves toward one end of the ferrite body from the source. The invention includes the arrangement of a wave reflector beyond the end of the ferrite body. We arrange a system of electromagnets adjacent the device for producing a magnetic field threaded at least a portion of the length of the body in a direction perpendicular to the direction of wave propagation therein. This field is of sufficient magnitude to render the ferrite body a substantially total reflector at a plane an odd number of quarter wave lengths in front of the reflector. We provide means for taking off reflected wave energy returning from the ferrite body in a direction opposite to that in which incoming waves from the source approach. The actual magnitude of the field for a given configuration is best determined by trial and error when the apparatus has been set up, but it will be appreciated that the plane at which total reflection by the ferrite is exhibited as stated is that at which the ferrite exhibits zero permeability and, in accordance with this invention, this plane is caused to be an odd number of quarter waves in front of the final reflector.

In a frequency shifter in accordance with this invention, the magnetic field is rotated at a desired ferquency of modulation. This is preferably achieved without mechanically moving parts by feeding the shift frequency to a phase splitting circuit to produce therefrom two equal amplitude components in quardrature and employing said components to energize one or other of two mutually perpendicular coil systems by which, accordingly, a rotating field will be produced.

Fig. 2 of the accompanying drawings illustrates schematically a simple embodiment of the invention, it being assumed in this figure that plane polarized waves are to be subjected to frequency shifting at a pre-determined frequency.

Referring to Fig. 2, incoming plane polarized waves are fed into a rectangular wave guide 1 and pass through a directional coupler 2, of any well known form, to a tapered wave guide section 3, over which the rectangular guide is merged into a circular guide 4.

The directional coupler is illustrated as of the well known type comprising two lengths of adjacent guide with the adjacent faces (usually, structurally, a common face) apertured to provide coupling between them. The apertures do not appear in Fig. 2. The shaded block 2a represents conventionally the usual reflectionless termination at one end of one guide length. Of course any other suitable directional coupler or a so-called "ferrite circulator" (such as is described in the Bell System Technical Journal, vol. XXXIV of January 1955, No. 1, at pages 5–103) could be used instead. In the circular length 4 of guide is a quarter wave plate 5 of any well known form adapted to transform the plane polarized waves into circularly polarized waves in normal fashion. The guide length 4 is shown broken away to show the plate 5. The circular length 4 of guide is terminated by a slug 6 of ferrite which is of such physical length as to provide a length of a quarter of a wave between the plane at which the effective permeability becomes zero and the plane of the reflector when subjected to an applied magnetic field as described hereinafter. In order to secure good impedance matching for the incident plane component which is not affected by the magnetic field, the slug is tapered on one side as shown in broken lines at 6a or some other known expedient, such as an iris, is adopted for the same purpose. The far end of the slug is terminated by a wave reflecting surface 7 constituted, in the illustrated case, by a short circuiting conductive plate across the end of the ferrite. Two mutually perpendicular pairs of coils 8 and 9 are arranged around the slug as shown so that when energized they will produce a resultant magnetic field threading the slug in a direction perpendicular to that of the wave propagation therein, i.e. in a direction at right angles to the axis of the whole arrangement. Input shift frequency is applied at 10 to a transformer 11 the output from which is fed to a phase splitting circuit of well known form so as to produce two equal amplitude phase quadrature components of the shift frequency. One quadrature component is fed to one pair of coils and the other to the other, so that, as will be apparent, the two pairs of coils produce between them a resultant field which rotates at a speed determined by the shift frequency. The magnitude of this field is chosen at a value substantially corresponding to the point X of the Fig. 1 where the value of $\mu$ is zero. Frequency shifted output is taken off from the output guide 12 of the directional coupler 2.

It will be seen that with this arrangement, owing to the value of the magnetic field chosen, incoming wave components whose direction of magnetic polarization is at right angles to the direction of the magnetic field at any instant will be reflected at a plane a quarter wave in front of the reflector 7, total reflection occurring there for such components. The ferrite will, however, act as though it were a dielectric for wave components whose direction of magnetic polarization is parallel to the magnetic field at the instant considered. This is because, for such components, the effective permeability of the ferrite is unity. Such components will, therefore, traverse the slug to be reflected by the reflecting termination 7, and will then re-emerge having suffered a phase shift of 180° in relation to perpendicular components which have been totally reflected as above described. The two components—one reflected before the final reflector and the other from the said reflector—combine to form a circularly polarized wave travelling in the opposite direction to the incoming wave and with its direction of circular polarization opposite to that of the said incoming wave. This re-formed circularly polarized wave passes back through the circular guide 4 with its quarter wave plate 5 where it is transformed into plane polarized waves which emerge from the output guide 12 of the directional coupler 2. This output wave will be shifted in frequency by $\pm 2n$ where $n$ is the number of revolutions per second of the magnetic field, i.e. the modulating frequency.

Arrangements in accordance with this invention have the great practical advantage over known arrangements that the magnitude of the magnetic field required is by no means critical, for as will be observed from Fig. 1, the curve of effective permeability passes through zero very slowly, i.e. the slope of the curve is quite small at and near the point X.

While we have described our invention in certain preferred embodiments, we realize that modifications may be made, and we desire that it be understood that no limitations upon our invention are intended other than may be imposed by the scope of the appended claims.

We claim:

1. A phase shifting device for shifting the phase of very high frequency electro-magnetic waves comprising a circular wave guide, a source of circularly polarized waves to be shifted in phase, a substantially loss-less ferrite body which substantially fills said circular wave guide, means for directing circular polarized waves from said source towards one end of said body, a wave reflector beyond said last mentioned end of said body, a system of electro-magnetic coils electrically connected to produce a magnetic field threading at least a portion of the length of said body in a direction perpendicular to the direction of wave propagation therein, said field being of sufficient magnitude and so disposed as to render the ferrite body a substantially total reflector at a plane an odd number of quarter wave lengths in front of said reflector, and means for taking off reflected wave energy returned from said body in a direction opposite to that in which incoming waves from the source approach.

2. A phase shifting device for shifting the frequency of very high frequency electro-magnetic waves as set forth in claim 1 wherein the system of electro-magnetic coils comprises two mutually perpendicular electro-magnets, means for feeding said electro-magnets with equal amplitude phase shifting currents in quadrature for producing a resultant field rotating at the shifting frequency.

3. A phase shifting device for shifting the frequency of very high frequency electro-magnetic waves as set forth in claim 1 wherein the end of the ferrite body remote from the total reflector and extending toward said wave guide is tapered.

4. A phase shifting device for shifting the frequency of very high frequency electro-magnetic waves as set forth in claim 1 wherein said total reflector comprises a short circuiting conductive plate extending across the end of the ferrite body remote from the end of the ferrite body through which waves from said source approach, said plate extending in a plane normal to the axis of said ferrite body.

5. A phase shifting device for shifting the frequency of very high frequency electro-magnetic waves as set forth in claim 1 in which there is a substantially rectangular wave guide and a tapered wave guide section connected therewith and merging into said circular wave guide, said substantially rectangular wave guide and said tapered wave guide section directing incoming waves from said source into said circular wave guide, a quarter wave plate interposed in said circular wave guide intermediate said ferrite body and said tapered wave guide section and wherein said reflector closes the end of said ferrite body adjacent the end of said circular wave guide remote from said source of polarized waves.

References Cited in the file of this patent

UNITED STATES PATENTS

| | | |
|---|---|---|
| 2,760,166 | Fox | Aug. 21, 1956 |
| 2,767,379 | Mumford | Oct. 16, 1956 |
| 2,787,765 | Fox | Apr. 2, 1957 |
| 2,798,205 | Hogan | July 2, 1957 |
| 2,814,784 | Riblet | Nov. 26, 1957 |
| 2,832,054 | Fox | Apr. 22, 1958 |

FOREIGN PATENTS

| | | |
|---|---|---|
| 721,309 | Great Britain | Jan. 5, 1955 |